United States Patent [19]
Jensen

[11] Patent Number: 5,088,317
[45] Date of Patent: Feb. 18, 1992

[54] METHOD AND APPARATUS FOR DETECTING LIQUID LEAKS FROM ABOVE-GROUND STORAGE TANKS

[75] Inventor: Jay E. Jensen, Raritan, N.J.

[73] Assignee: Mobil Oil Corporation, Fairfax, Va.

[21] Appl. No.: 588,236

[22] Filed: Sep. 26, 1990

Related U.S. Application Data

[60] Continuation-in-part of Ser. No. 413,577, Sep. 28, 1989, Pat. No. 4,964,296, which is a division of Ser. No. 183,181, Apr. 19, 1988, Pat. No. 4,893,498, and a continuation-in-part of Ser. No. 384,612, Jul. 25, 1989, abandoned.

[51] Int. Cl.$^5$ .............................................. G01M 3/26
[52] U.S. Cl. ........................................................ 73/49.2
[58] Field of Search ............................... 73/49.2, 299

[56] References Cited

U.S. PATENT DOCUMENTS

| | | | |
|---|---|---|---|
| 3,257,851 | 6/1966 | Altman et al. | 73/406 |
| 3,538,746 | 11/1970 | Jacobs et al. | 73/49.2 |
| 3,902,356 | 9/1975 | Rupf-Bolz | 73/49.2 |
| 3,939,383 | 2/1976 | Alm | 317/123 |
| 4,389,888 | 6/1983 | Morooka | 73/299 |
| 4,751,841 | 6/1988 | Biard et al. | 73/49.2 |
| 4,862,734 | 9/1989 | Elderton | 73/49.2 |

FOREIGN PATENT DOCUMENTS

| | | |
|---|---|---|
| 89589 | 5/1986 | Japan . |
| 607011 | 11/1975 | Switzerland . |

OTHER PUBLICATIONS

"Hydrostatic Liquid Level Measurement", by V. Lawford, Aug. 1970, pp. 79-81.

Primary Examiner—Hezron E. Williams
Assistant Examiner—Joseph W. Roskos
Attorney, Agent, or Firm—Alexander J. McKillop; Charles J. Speciale; Michael J. Mlotkowski

[57] ABSTRACT

A liquid leak detector for use with above-ground storage tanks. The liquid leak detector includes a vertically upright standpipe for filling with a liquid to a level that generates a hydrostatic head pressure substantially equivalent to that exerted by the liquid in the storage tank; a first pipe connected to the standpipe at about the bottom end thereof and adapted to be connected to the tank at about the bottom of the tank; a pressure transducer disposed within the first pipe for sensing hydrostatic head pressure differential between the liquid in the storage tank and the liquid in the standpipe to determine a change in pressure differential resulting from a change in the amount of liquid in the storage tank; and a hose connected above the level of the liquid in the standpipe and adapted to be connected to the tank above the level of the liquid in the tank.

13 Claims, 5 Drawing Sheets

METHOD AND APPARATUS FOR DETECTING LIQUID LEAKS FROM ABOVE-GROUND STORAGE TANKS

RELATED APPLICATIONS

This application is a continuation-in-part of co-pending application Ser. No. 413,577, filed on Sept. 8, 1989 now Pat. No. 4,964,296, which is a divisional of application Ser. No. 183,181, filed on Apr. 19, 1988, now U.S. Pat. No. 4,893,498, and a continuation-in-part of co-pending application Ser. No. 384,612, filed on Jul. 25, 1989, now abandoned.

FIELD OF THE INVENTION

The present invention relates to a liquid leak detector, and, more particularly, to a method and apparatus for detecting leaks from above-ground, vertical, uniformly shaped storage tanks.

BACKGROUND OF THE INVENTION

A major problem with above-ground liquid storage tanks, particularly those that contain liquids which can adversely contaminate the surrounding grounds, is to be able to determine if the tank leaks. This problem becomes greater in large tanks, greater than about 20 feet in diameter, since relatively large leaks will cause only a small change in the level of the liquid in such tanks. Also, in above-ground tanks, changes in the ambient, such as temperature and wind, can affect the level of the liquid in the tank.

Heretofore, the best available technique for determining leaks for above-ground tanks was to put a six foot head of water in the tank and use visual detection of liquid level variations in a sight glass outside the tank to measure possible leaks. This technique has the disadvantage that the accuracy of the visual detection is limited to about 1/16 inch variation in the tank. This means that for a 100 foot diameter tank there must be a leak of at least 300 gallons and for a 50 foot diameter tank there must be a leak of about 100 gallons to obtain a detection of the leak. Also, changes in temperature, which can cause the liquid in the tank to expand, significantly affects the measurement as well as wind effects and sight glass meniscus resolution.

Another technique which has been considered is to place a pressure transducer adjacent the bottom of the tank which measures the pressure of the liquid at the bottom of the tank. This technique is not affected by changes in temperature since although the volume of the liquid may change due to expansion of the liquid, its weight does not change. This technique has the problem that it requires a transducer which can not only measure the heavy weight of the liquid in the tank, but which can also measure slight differences in the weight. Such a transducer is either not readily available or is expensive.

Swiss Patent No. 607,011 discloses a checking device for leakage from large liquid reservoirs and tanks which utilizes a pressure sensitive detector having two chambers separated by a diaphragm. One chamber of the detector is connected to the reservoir and the other to a reference tube. The diaphragm of the pressure sensitive detector can be moved toward a contact member to close an electrical signalling circuit in the event that a leak develops. However, the arrangement disclosed in Swiss Patent No. 607,011 would not be expected to have the accuracy required to assure tank integrity in light of today's environmental concerns and regulations.

Therefore, it would be desirable to have a detector for accurately detecting small leaks in large above-ground tanks which is not affected by changes in ambient conditions and which is relatively inexpensive.

SUMMARY OF THE INVENTION

According to the present invention, there is provided a leak detector for use with a liquid storage tank, the leak detector utilizing an upright standpipe which can be filled with a liquid to a level that generates a hydrostatic head pressure substantially equivalent to that exerted by the liquid in the storage tank. The pressure differential between the pressure of the liquid in the tank and the liquid in the standpipe is measured. Any difference in this pressure differential indicates that there is a leak in the tank.

The leak detector comprises a vertically upright standpipe having an upper end and a bottom end for filling with a liquid to a level that generates a hydrostatic head pressure substantially equivalent to that exerted by the liquid in the storage tank; a first pipe connected to the standpipe at about the bottom end thereof and adapted to be connected to the tank at about the bottom of the tank; means for sensing hydrostatic head pressure differential between the liquid in the storage tank and the liquid in the standpipe to determine a change in pressure differential resulting from a change in the amount of liquid in the storage tank, the means for sensing hydrostatic head pressure differential comprising a pressure transducer disposed within the first pipe having an electrical output signal proportional to the head pressure differential; and a hose connected above the level of the liquid in the standpipe and adapted to be connected to the tank above the level of the liquid in the tank.

Also provided is a liquid storage system, which comprises: an upright storage tank mounted substantially at ground level, the storage tank containing a liquid; and a leak detector for the storage tank, comprising: (i) a vertically upright standpipe having an upper end and a bottom end for filling with a liquid to a level that generates a hydrostatic head pressure substantially equivalent to that exerted by the liquid in the storage tank; (ii) a first pipe connected to the standpipe at about the bottom end thereof and adapted to be connected to the tank at about the bottom of the tank; (iii) means for sensing hydrostatic head pressure differential between the liquid in the storage tank and the liquid in the standpipe to determine a change in pressure differential resulting from a change in the amount of liquid in the storage tank, the means for sensing hydrostatic head pressure differential comprising a pressure transducer disposed within the first pipe having an electrical output signal proportional to the head pressure differential; and (iv) a hose connected above the level of the liquid in the standpipe and adapted to be connected to the tank above the level of the liquid in the tank.

Further, a method of detecting leakage of a liquid from an above-ground tank of uniform dimensions is provided. The method of the present invention comprises the steps of: filling an upright standpipe of uniform dimensions with a liquid to a level that generates a hydrostatic head pressure substantially equivalent to that exerted by the liquid in the storage tank; and measuring the pressure differential between the pressure of the liquid at about the bottom of the tank and the pressure of the liquid at about the bottom of the standpipe to determine an change in the pressure differential caused by leakage of liquid from the tank.

DETAILED DESCRIPTION OF PREFERRED EMBODIMENTS

Figure 1:
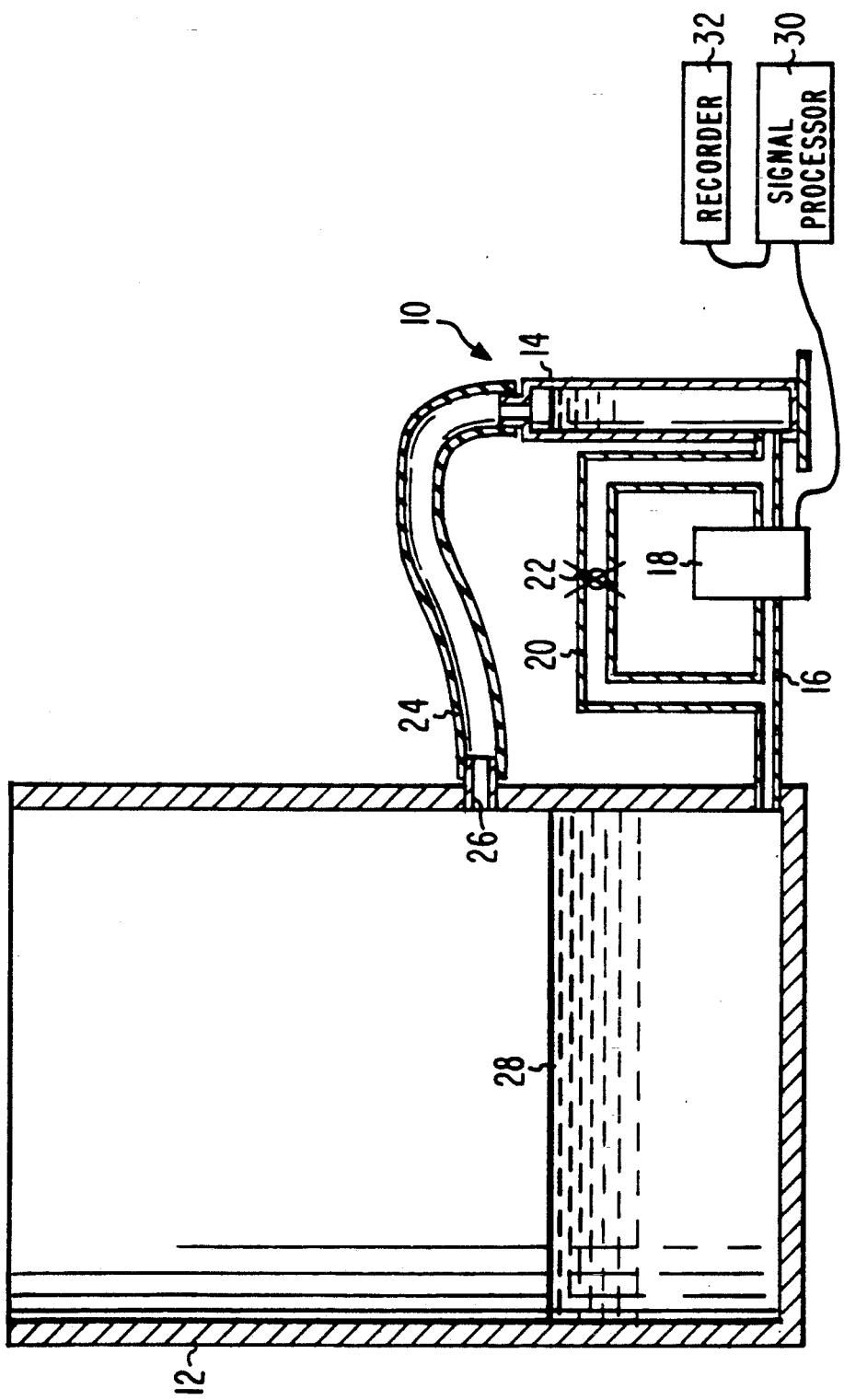
FIG. 1 is a schematic presentation of the liquid leak detector of the present invention.

Referring initially to FIG. 1, there is shown a leak detector 10 of the present invention connected to an above-ground cylindrical storage tank 12. The detector includes an upright cylindrical standpipe 14 positioned on the ground adjacent the tank 12. Tubing or pipe 16 extends between the standpipe 14 and the tank 12 approximately adjacent the bottom of each. Tubing or pipe 16 connects to a pressure transducer 18 which separates the standpipe 14 from the tank 12 and is adapted to measure pressure differentials. An optional second tube or pipe 20 extends between the standpipe 14 and the tank 12 bypassing the transducer 18. The optional second tube or pipe 20 contains a valve 22. A hose 24 is connected between the standpipe 14, at or near the top thereof, and an outlet opening 26 in the tank 12 above the level of the liquid 28 in the tank 12. The transducer 18 is electrically connected to a signal processor 30 for processing the signal from the transducer 18, and the signal processor 30 is electrically connected to a recorder 32, such as a pen recorder, for recording the output of the signal processor 30, creating a record of the output of signal processor 30. A recorder found to be suitable for this application is the battery operated Soltec Primeline ® Model 6723, available from Soltec Corporation of Palo Alto, CA.

Figure 6:
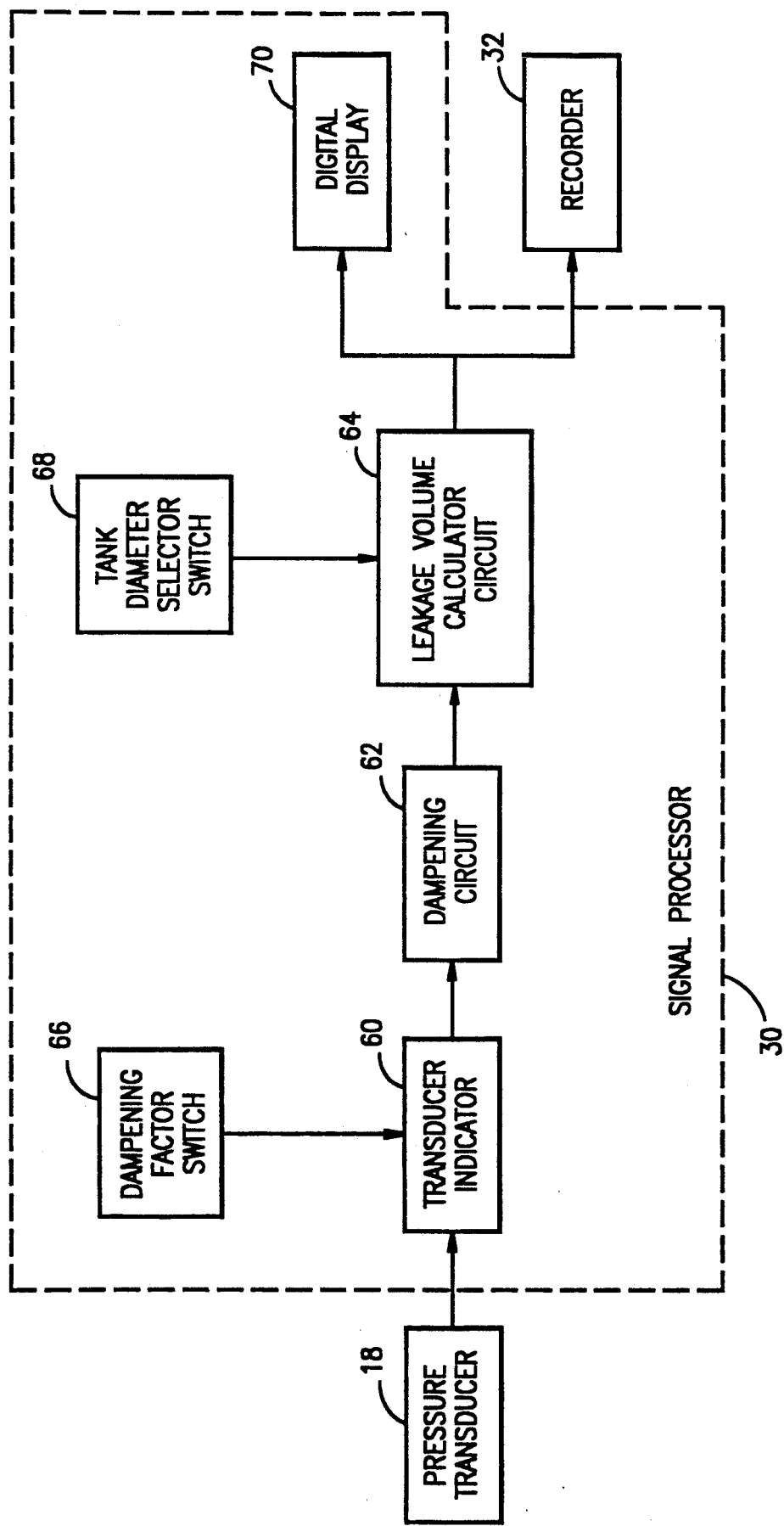
FIG. 6 is a block diagram illustrating key component circuits contained within the signal processor and their interaction with other leak detector system components.

Referring now to FIG. 6, a block diagram is presented which identifies the chief components and circuits which comprise the signal processor 30 used in the practice of the present invention. As shown, the output from pressure transducer 18 is fed into transducer indicator 60. The preferred transducer indicator is the Validyne CD379 battery operated digital transducer indicator, available from Validyne Engineering Corporation of Northridge, CA. The preferred transducer indicator 60 provides circuitry for transducer excitation and signal conditioning and outputs DC signal proportional to the pressure differential sensed by pressure transducer 18. The preferred pressure transducer 18 is the Validyne DP-103 liquid-to-liquid differential pressure transducer capable of resolving differences on the order of 0.001 inches of water column (0.0000361 psi). The output from transducer indicator 60 is fed into dampening circuit 62 wherein additional signal conditioning is provided. Additional dampening is required to eliminate or minimize small signal variations caused by wind effects on the tank liquid surface 28 and/or mechanical vibrations. Dampening factor switch 66 is provided so that the degree of dampening is adjustable. This feature can be advantageously utilized to adjust for the severity of prevailing weather conditions. The output of dampening circuit 62 is fed into the leakage volume calculator circuit 64. As those skilled in the art will readily understand, to convert a differential pressure reading into a volumetric value, the cross-sectional area of the tank being tested must be considered. This is done through the use of tank diameter selector switch 68. The output from the leakage volume calculator circuit is then fed simultaneously into a digital display 70 and into recorder 32.

As indicated, although standpipe 14 can be plumbed so that it can be filled with the liquid present in tank 12, this is not necessary. As can be appreciated, when installed at a bulk fuel storage terminal, the liquid in tank 12 will generally be a volatile hydrocarbon such as gasoline and, therefore, it may be impractical or undesirable to use such liquid in the standpipe. Therefore, it is often preferred that water be used to fill the standpipe, as the use of same greatly reduces problems associated with safety, in general, and volatility. To accommodate winter weather testing, a suitable mixture of antifreeze and water can be formulated and used to fill standpipe 14. For example, a mixture of 50% water and 50% glycol has been successfully used and would be expected to provide adequate performance under virtually all conditions. As can be appreciated, when the liquid in standpipe 14 is different from the liquid present in tank 12, the actual level of liquid 28 in tank 12 will differ from the actual level of liquid 44 in standpipe 14 under conditions when system pressures are balanced. This difference in liquid level between tank 12 and standpipe 14 will be proportional to the difference in the density or specific gravity of the two fluids.

When it is desired to utilize tank liquid 28 to fill standpipe 14, the valve 22 is opened to allow liquid 28 from the tank 12 to flow through the second tube or pipe 20 into the standpipe 14 until the level of the liquid in the standpipe is level with that in the tank 12. The valve 22 is then closed to disconnect the tank 12 from the standpipe 14.

After filling standpipe 14 to the proper level, it is important to assure that air bubbles are not entrained within the standpipe liquid. To minimize this occurrence, a small amount of a household detergent can be added to the liquid to reduce its surface tension. Also, drawing a vacuum on the standpipe has been found to aid in the process of air bubble de-entrainment. This can be accomplished by connecting a suitable vacuum pump at the point where wind compensation tube 24 is connected for testing. The pump is used to apply a vacuum of approximately 15 inches of mercury to the standpipe for a period of about 2 minutes. During this period, the standpipe can be tapped to aid in the release of bubbles from the liquid. Following this operation, the vacuum pump is removed. Air must also be bled from tubing or pipe 16. This is accomplished through the use of transducer air bleed valves (not shown), which are present on either side of pressure transducer 18. The air bleed valves are opened while a pressure head is applied and liquid flow permitted until no air bubbles are seen to exit via the bleed valves. Upon completing this step, hose 24 is installed between the top of standpipe 14 and outlet opening 26.

Following the removal of air from the system, it may be necessary to reestablish the proper standpipe liquid height 44. This is accomplished through the use of pressure transducer 18, signal processor 30 and recorder 32. To adjust the level of liquid 44 in standpipe 14, one end of a piece of flexible tubing is connected to a valve (not shown) located near the bottom of standpipe 14, the other end to a liquid container. The valve is then opened to establish a low flow rate and the response of the falling liquid head monitored on recorder 32. Pen deflection of recorder 32 will occur as the standpipe liquid head pressure approaches the tank liquid pressure. The container and flexible tube arrangement connected at the valve can be raised or lowered to permit flow from or to standpipe 14, as those skilled in the art will readily understand. When using the signal processor of the preferred embodiment, the arithmetic sign of the displayed leakage volume calculation can be used to determine whether the liquid head of standpipe 14 is greater than or less than that of tank 12. If negative, the standpipe liquid head is greater than that of tank 12, requiring some fluid to be removed, while a positive reading signifies that the standpipe liquid head is less than that of tank 12, requiring that some fluid be added.

Upon balancing the system and calibrating the instrumentation, a tank leak test can be conducted. The tank diameter selection switch 68 should be set to the value closest to the actual diameter of tank 12. The dampening factor switch should initially be set to a mid-range value. (A higher degree of dampening may be necessary in the event of severe wind conditions). With the recorder turned on, at least five gallons of liquid should be removed from tank 12 to assure that sufficient recorder resolution exists. Once this is assured, the tank leak test can be begun. Test duration should be at least 4 hours. Longer periods may be required for large diameter tanks. If there is a leak in the tank 12, the level of the liquid 28 in the tank 12 will change causing a change in the pressure measured by the transducer 18. This results in a change in the pressure differential being read by the transducer 18 which will be indicated by the recorder 32.

Since the level of the liquid in the standpipe 14 does not change, small changes in the level of the liquid 28 in the tank 12 resulting from small leaks, will be detected by the transducer 18. This makes it possible to use the very sensitive liquid to liquid differential pressure transducer 18 described above. Since the transducer 18 is measuring pressure head and not volume of liquid, changes in the level of the liquid in either the tank 12 o standpipe 14 resulting from temperature changes will not affect the output of the transducer 28. Also, since the top of the standpipe 14 is connected to the tank 12 above the level of the liquid 28 by the hose 24, wind effects on the liquid 28 in the tank 12 will also be applied to the liquid 44 in the standpipe 14. Since the transducer 18 is measuring a difference in pressure, the wind effects will be cancelled out and will not affect the output of the transducer 18.

Figure 2:
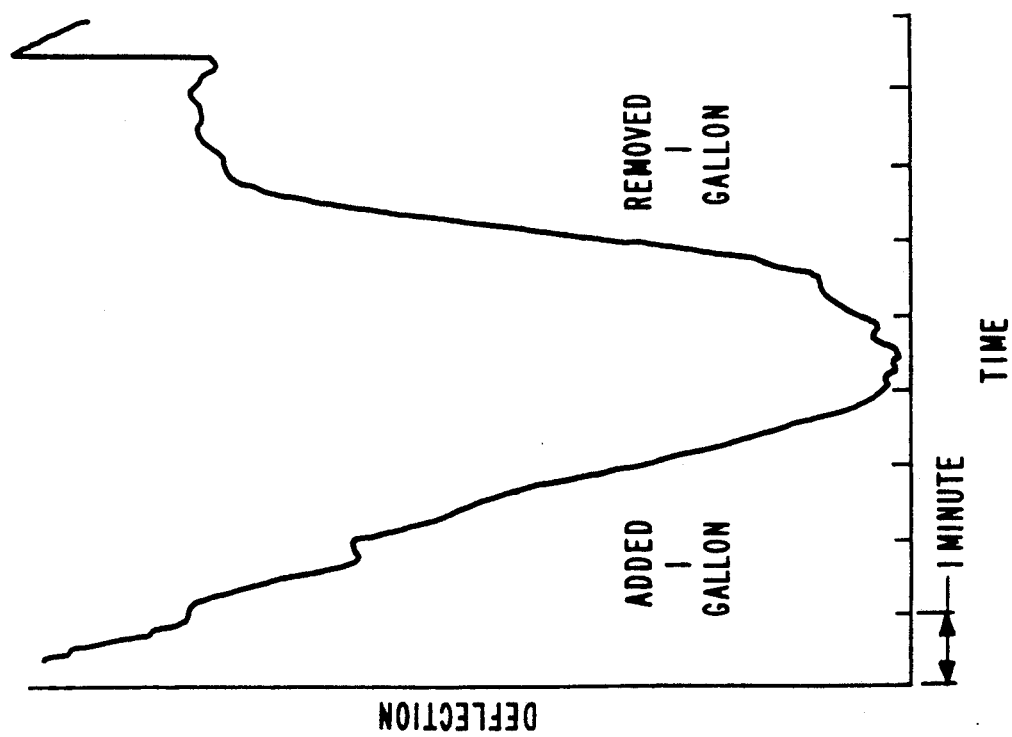
Figure 3:
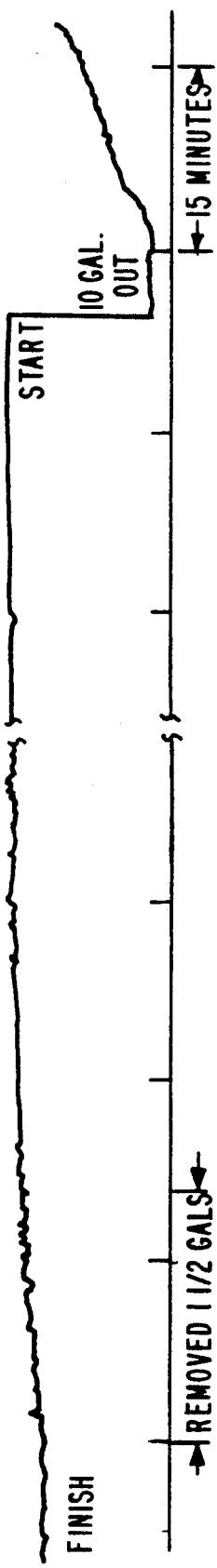

FIGS. 2 to 5 show the recordings made from tests made on various tanks using the leak detector 10 of the present invention. For the tests shown in FIGS. 2 and 3, the tank used was 50 feet in diameter, 35 feet high and contained approximately 60,000 gallons of water. FIG. 2 shows the output of the recorder 32 when a gallon of water was removed from the tank over a period of 1 minute and then added back to the tank. As can be seen from FIG. 2 this slight change in the amount of liquid in the tank was clearly discerned by the leak detector. FIG. 3 shows the output of the recorder when 1½ gallons of water were removed for the tank over a period of about 20 minutes. This shows that a slower leak can also be easily discerned by the leak detector 10.

Figure 5:
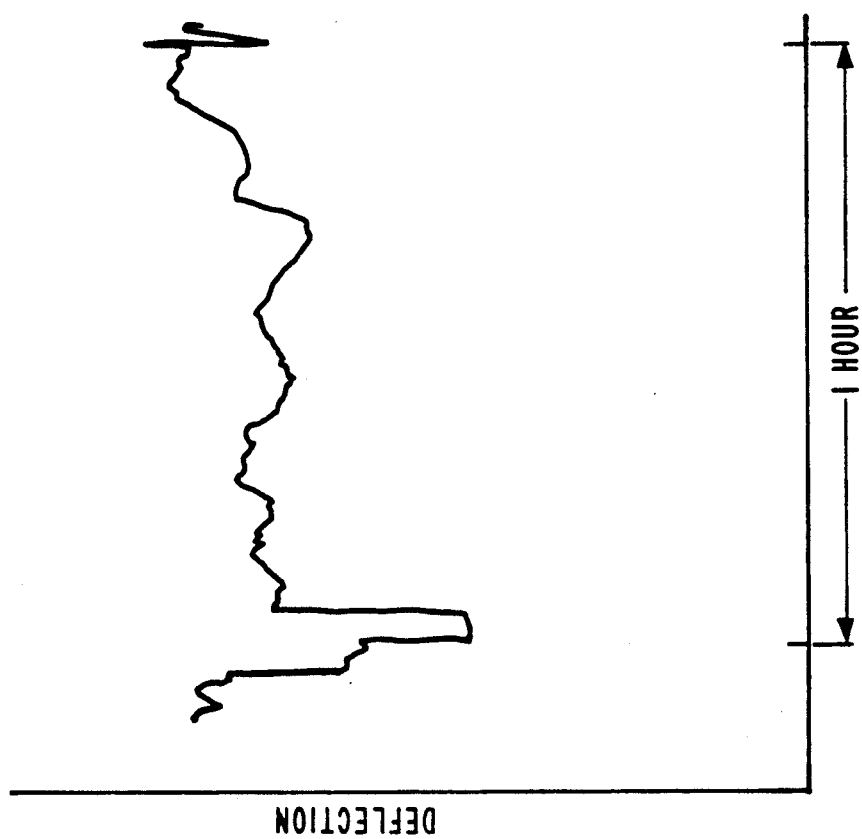
FIGS. 2 to 5 are graphs showing the results of leak tests made on tanks using the detector of the present invention.
Figure 4:
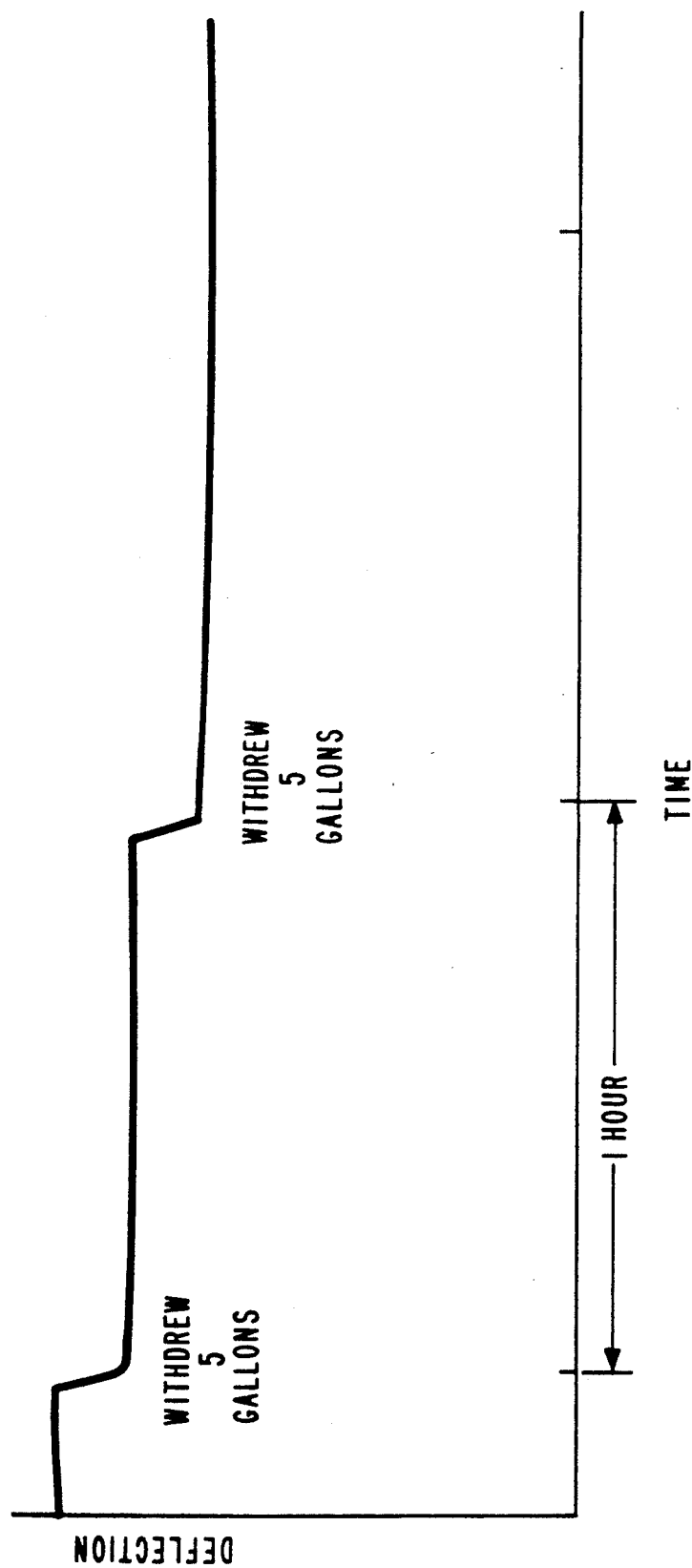

For the test shown in FIG. 4, the tank used was 30 feet in diameter and 41 feet high. The tank contained Mobil Heating Oil No. 2 at a depth of 37 inches (about 16,000 gallons). During a test period of 2⅓ hours, 5 gallons of oil were rapidly removed near the beginning of the test period and another 5 gallons were removed near the middle of the test period. The removal of these two small amounts of the oil can be clearly seen in FIG. 4 by the two drops in the chart. FIG. 5 shows the results of a field test in which a tank 75 feet in diameter and 40 feet high contained about 7 feet 7 inches of Mobil Heating Oil No. 2 (approximately 257,705 gallons). At the start of the test 4 gallons of oil were rapidly removed from the tank. This can be clearly seen by the overall drop in the line of the chart. The chart undulations result from the effect of cold, windy weather conditions. However, these conditions do not adversely affect the ability to detect even small amounts of liquid leaking from the tank.

Thus, there is provided by the present invention a method and apparatus for detecting leaks in aboveground, storage tanks which will accurately detect small leaks The detector of the present invention is not adversely affected by changes in ambient conditions, such as temperature, wind and the like, and is inexpensive to manufacture and install The leak detector of the present invention can be used satisfactorily for liquids that are very volatile and whose vapors are heavier than air, such as gasoline. Also, it can be used as part of, or in conjunction with, a storage tank inventory control system.

Although the present invention has been described with preferred embodiments, it is to be understood that modifications and variations may be resorted to without departing from the spirit and scope of the present invention, as those skilled in the art will readily understand. Such modifications and variations are considered to be within the purview and scope of the appended claims.

What is claimed is:

1. A liquid leak detector for detecting a change in liquid amount in a storage tank, comprising:
   (a) a vertically upright standpipe having an upper end and a bottom end for filling with a liquid to a level that generates a head pressure substantially equivalent to that exerted by the liquid in the storage tank;
   (b) a first pipe connected to said standpipe at about said bottom end thereof and adapted to be connected to the tank at about the bottom of the tank;
   (c) means for sensing hydrostatic head pressure differential between the liquid in the storage tank and the liquid in the standpipe to determine a change in pressure differential resulting from a change in the amount of liquid in the storage tank, said means for sensing hydrostatic head pressure differential comprising a pressure transducer disposed within said first pipe having an electrical output signal proportional to the head pressure differential;
   (d) a hose connected above the level of the liquid in the standpipe and adapted to be connected to the tank above the level of the liquid in the tank; and
   (e) a signal processor electrically connected to said pressure transducer.

2. A leak detector in accordance with claim 1, further comprising means for connecting said standpipe to the storage tank at about the bottom of the tank to fill the standpipe with the liquid in the tank to substantially the same level as the liquid in the tank.

3. A leak detector in accordance with claim 2, in which the means for connecting the standpipe to the tank is a second pipe connected to the standpipe and bypassing the transducer having a valve within said second pipe.

4. A leak detector in accordance with claim 1, wherein said signal processor includes a transducer indicator having circuitry for transducer excitation and signal conditioning.

5. A leak detector in accordance with claim 4, wherein said signal processor further includes a signal dampening circuit for additional signal conditioning to minimize small signal variations caused by wind effects and mechanical vibrations.

6. A leak detector in accordance with claim 1, further comprising a recorder connected to said signal processor to record the output thereof.

7. A liquid storage system, comprising:
(a) an upright storage tank mounted substantially at ground level, said storage tank containing a liquid; and
(b) a leak detector for said storage tank, comprising:
  (i) a vertically upright standpipe having an upper end and a bottom end for filling with a liquid to a level that generates a head pressure substantially equivalent to that exerted by the liquid in the storage tank;
  (ii) a first pipe connected to said standpipe at about said bottom end thereof and adapted to be connected to the tank at about the bottom of the tank;
  (iii) means for sensing hydrostatic head pressure differential between the liquid in the storage tank and the liquid in the standpipe to determine a change in pressure differential resulting from a change in the amount of liquid in the storage tank, said means for sensing hydrostatic head pressure differential comprising a pressure transducer disposed within said first pipe having an electrical output signal proportional to the head pressure differential;
  (iv) a hose connected above the level of the liquid in the standpipe and adapted to be connected to the tank above the level of the liquid in the tank; and
  (v) a signal processor electrically connected to said pressure transducer;
wherein the storage tank and said standpipe are each of uniform vertical dimensions and each are substantially cylindrical along their vertical dimensions.

8. A storage system in accordance with claim 7, wherein said leak detector further comprises means for connecting said standpipe to the storage tank at about the bottom of the tank to fill the standpipe with the liquid in the tank to substantially the same level as the liquid in the tank.

9. A storage system in accordance with claim 8, in which the means for connecting the standpipe of said leak detector to the tank is a second pipe connected to the standpipe and bypassing the transducer having a valve within said second pipe.

10. A storage system in accordance with claim 7, wherein said signal processor of said leak detector includes a transducer indicator having circuitry for transducer excitation and signal conditioning.

11. A storage system in accordance with claim 10, wherein said signal processor of said leak detector further includes a signal dampening circuit for additional signal conditioning to minimize small signal variations caused by wind effects and mechanical vibrations.

12. A storage system in accordance with claim 7, wherein said leak detector further comprises a recorder connected to said signal processor to record the output thereof.

13. A method of detecting leakage of a liquid from an above-ground tank of uniform dimensions comprising the steps of:
(a) filling an upright standpipe of uniform dimensions with a liquid to a level that generates a head pressure substantially equivalent to that exerted by the liquid in the storage tank;
(b) measuring the pressure differential between the pressure of the liquid at about the bottom of the tank and the pressure of the liquid at about the bottom of the standpipe to determine any change in the pressure differential caused by leakage of liquid from the tank, wherein the pressure differential is measured using a pressure transducer, the pressure transducer having an electrical output signal proportional to the pressure differential;
(c) connecting the top of the standpipe to the tank above the liquid in the tank so that the same ambient conditions are applied to the liquids in the tank and standpipe; and
(d) operatively connecting the output of the pressure transducer to a signal processor.

* * * * *